Aug. 21, 1962  A. W. KAWALLE  3,049,764
BRIDGING FOR JOISTS AND STUDDING
Filed July 29, 1960
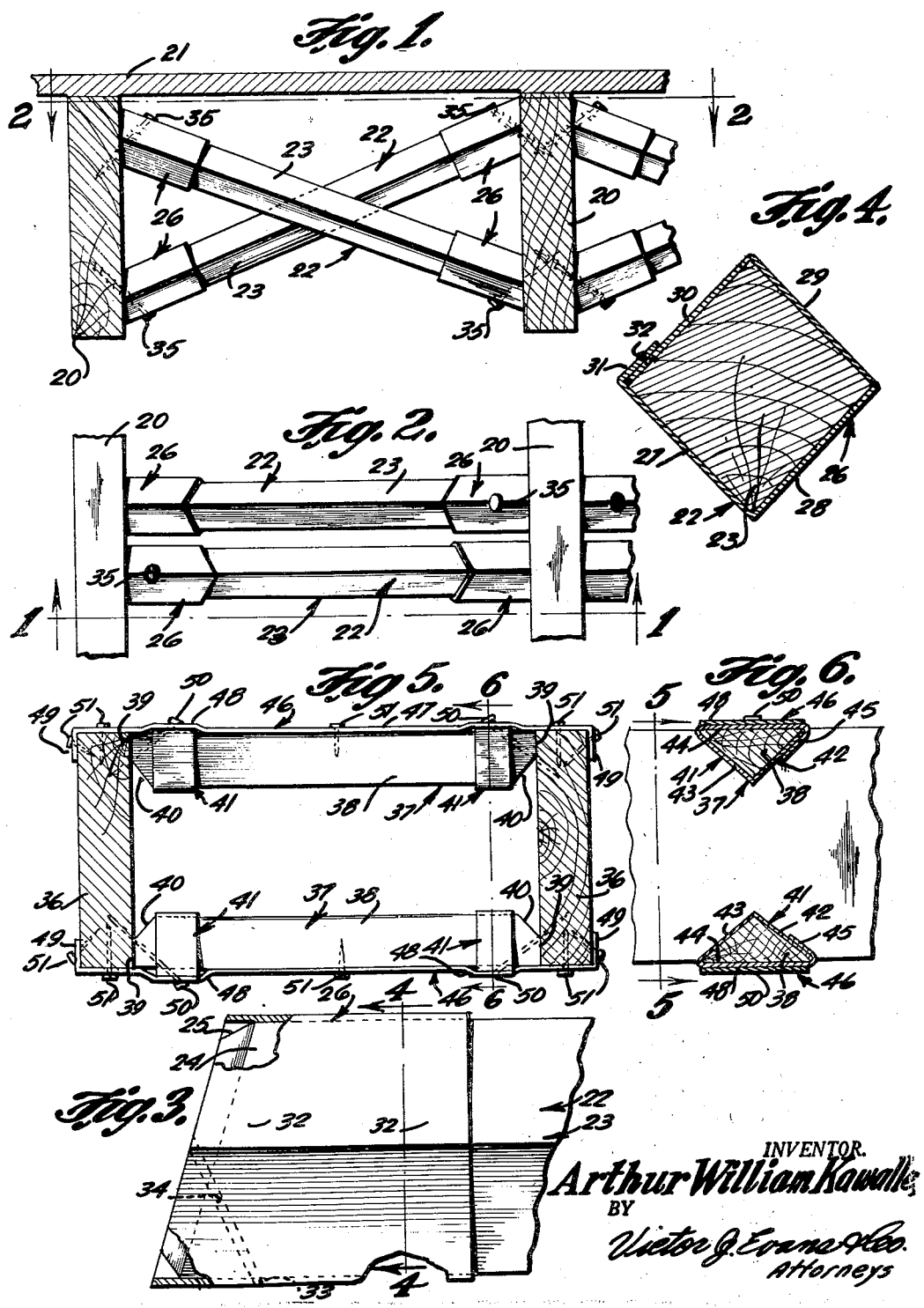
INVENTOR.
Arthur William Kawalle
BY
Victor J. Evans & Co.
Attorneys

United States Patent Office 3,049,764
Patented Aug. 21, 1962

3,049,764
BRIDGING FOR JOISTS AND STUDDING
Arthur William Kawalle, Manitowoc, Wis.
Filed July 29, 1960, Ser. No. 46,153
1 Claim. (Cl. 20—9)

This invention relates to structural members such as joists and studding for use in construction work such as for use in the construction of homes or the like, and the primary object of the present invention is to provide bridging for construction material such as joists or studding wherein splitting of the bridging or beams will be minimized or prevented, and wherein an increased holding power will be insured.

A further object is to provide bridging for joists and studding which will insure that the maximum structural strength will be provided, and wherein the bridging of the present invention can be used in different locations as for example it can be used as bridging for floor joists, or it can be used between studding or the like.

A still further object is to provide such a bridging that is rugged in structure and foolproof in operation or use, and which is economical to manufacture and efficient in operation and which can be readily utilized in various types of construction work such as in building structures or the like.

These and other objects of the invention will become apparent from a reading of the following specification and claim, taken with the accompanying drawings, wherein like parts are referred to and indicated by like reference characters and wherein:

FIGURE 1 is a sectional view taken on the line 1—1 of FIGURE 2.

FIGURE 2 is a sectional view taken on the line 2—2 of FIGURE 1.

FIGURE 3 is an enlarged elevational view illustrating certain constructional details of the present invention.

FIGURE 4 is a sectional view taken on the line 4—4 of FIGURE 3.

FIGURE 5 is a fragmentary sectional view illustrating a modification, and taken on the line 5—5 of FIGURE 6.

FIGURE 6 is a sectional view taken on the line 6—6 of FIGURE 5.

As shown in the drawing, and in particular in FIGURES 1 through 4 of the drawings, the numeral 20 indicates structural members such as joists or studding which can be used as for example for supporting horizontally disposed flooring 21, and according to the present invention there is provided bridging units 22 which are shown arranged in FIGURE 1 in criss-cross spaced apart relation with respect to each other, and the bridging units 22 each have the same construction and each includes a beam 23 which may be rectangular in cross-section, FIGURE 4.

The outer ends of the beams 23 are inclined at an angle as indicated by the numeral 24, and end portions of the beams are chamfered as indicated by the numeral 25, for a purpose to be later described.

Mounted on the ends of the beams 23 are ferrules 26, and the ferrules 26 each comprise portions such as the portions 27, 28, 29, 30 and 31 which surround the end of the beam, and the portions 31 and 30 may be arranged in overlapping relation with respect to each other and may be secured together as for example by means of spot welding as indicated by the numeral 32.

The ferrules have their ends open, and as shown in FIGURE 3, the outer end of the ferrule is inclined and is flush with the outer end 24 of the beam 23. Registering apertures or openings 33 and 34 are arranged in the ferrules and beams, and securing elements 35 are arranged at an angle, and these securing elements 35 extend through the registering apertures 33 and 34 and into engagement with the joists 20, as for example as shown in FIGURE 1.

Referring now to FIGURES 5 and 6 of the drawings, there is illustrated a modification or alternative construction wherein the numeral 36 indicates spaced parallel joists or studding, and the numeral 37 indicates spaced apart bridging units which are operatively connected to the joists 36, and each of the bridging units 37 includes a beam 38 which may be triangular in cross-section, as shown in FIGURE 6. The end portions 39 of the beam 38 are flat for snugly engaging the inner surfaces of the joists 36, and these end portions 39 are arranged in spaced parallel relation with respect to each other. Portions of the beams 38 adjacent the ends 39 are chamfered as indicated by the numeral 40 and this chamfer is arranged at an angle as shown in FIGURE 5.

Spaced apart ferrules 41 are mounted on each beam 38, and each of the ferrules 41 includes portions 42, 43 and 44 which surround the beam, and the ferrules 41 also includes a portion 45 which is arranged in overlapping relation with respect to the portion 42, and the portions 45 and 42 may be secured together as for example by spot welding.

The numeral 46 indicates metal straps or strips which extend longitudinally along the beams 38, and each strip 46 includes a main straight section 47 as well as offset portions or sections 48 which snugly engage or receive the ferrules 41, FIGURE 5, and each strip 46 is provided with transverse or right angularly arranged end portions 49, and suitable fastening members such as nails 51 can be extended through various portions of the strips 46 in order to fasten the strips to the beams 38 and to the joists 36. Inclined securing elements 50 are adapted to be extended through the offset portions 48 of the strips and through suitable registering openings or apertures in the ferrules and beams whereby as shown in FIGURE 5 these securing elements 50 can be arranged adjacent the joists 36 in order to help maintain the parts in their proper assembled position.

From the foregoing, it will be seen that there has been provided a bridging arrangement for floor joists, studding or the like, and with the parts arranged as shown in the FIGURES 1 through 4, it will be seen that joists such as the joists 20 can be maintained in their proper spaced apart relation, as for example when such joists 20 are being used for supporting flooring such as the flooring 21. While only a pair of the bridging 22 have been illustrated, it is to be understood that the number thereof can be varied as desired or required. Each of the bridge units 22 includes the beams 23 which has the inclined or angled beveled end portion 24 so as to snugly engage the inner surface of the joists 20, and with the pair of the bridge units 22 arranged in criss-cross spaced apart relation as shown in FIGURE 1, and with the ends of the bridge units connected to the joists 20 as at 35 it will be seen that these joists 20 will be firmly anchored in place. The beams 23 may be rectangular in cross-section as shown in FIGURE 4, and a ferrule 26 is mounted on each end of the beam 23, and the ends of the ferrules are open so that the ferrules can be readily slipped on to or mounted onto the ends of the beams, and the ferrules have a cross-section which conforms to the cross-section of the beam so that the ferrule will be mounted snugly on the beam. As shown in FIGURE 3 the outer end of the ferrule is flush with the outer end portion 24 of the beam so that the outer end of the ferrule will abut the inner surface of the joist 20. The overlapping portions 31 and 30 of the ferrule are adapted to be spot welded as at 32 so that the ferrule will be maintained on the beam, and end portions of the beam 22 are adapted to be chamfered as at 25 so as to facilitate the initial insertion of the beam in the ferrule. The ferrule and beam are provided with registering openings 33 and 34 whereby securing elements 35 can be extended through these registering openings and into engagement with the joist 20 so as to maintain the bridging 22 and joist connected together.

In the modification of FIGURES 5 and 6, the bridge units 37 are connected to the spaced apart joists or studding 36 and these joists or studding can be used for any desired purpose, as for example in the construction of homes or the like. Each of the bridging units 37 includes the beams 38 which has flat end portions 39 that engage the inner surface of the joists 36, and end portions of the beams 38 are beveled or chamfered as at 40, and a plurality of ferrules 41 are mounted on each beam 38. These ferrules 41 may include overlapping portions 42 and 45 that are spot welded together, and a strip 46 extends longitudinally along the beam 38, and the strip 46 is provided with offset portions 48 that provide clearance and snugly engage the adjacent portions of the ferrules 41, and the strip 46 is also provided with transverse end portions 49 which are arranged contiguous to the outer surface of the joists 36. The end portions 49 are secured to the joists 36 as for example by means of nails 51, and the strips 46 are also secured to the beam 38 by nails 51. Securing elements 50 extend through the offset portions 48 and through the ferrules 41 and through the beam 38 and into engagement with the joists 36.

It is to be understood that the different parts can be made in various sizes or shapes as desired or required, and different types of material can be utilized for the various elements or components as desired or required.

The bridging units can be used between different types of structural wood members such as studs, joists, or the like. The triangular bridging units 37, shown in FIGURES 5 and 6, lend themselves to prefabrication and may be laid in end to end spaced relation on the strip 46 and secured thereto by suitable fastening elements such as nails which have their heads exteriorly of the strip 46 and their shanks extending through registering holes provided in the strip 46 and the ferrules 41 and into the end portions of the units 37. Each unit 37 has its end portion partially encircled by the adjacent ferrule 41 and the ferrules 41 are preferably tightly crimped about the end portions of the units 37 so as to compress the wood fibres and lessen the tendency of the wood to split when the nails are driven thereinto. The ferrules 41 also serve as supports to help hold the bridging in the proper location. The metal strip has the overhanging portions 49 so that nails can be driven through these portions 49 as indicated by the numeral 51 and these nails can be driven into the joists on an angle as shown in the drawings. The arrangement shown in FIGURES 5 and 6 can be used between the studdings or between joists and with the parts arranged as shown in FIGURES 5 and 6, when the bridge units 37 are driven between the joists 36, the beams or wooden members 38 will not separate into a plurality of useless pieces. Or, if the bridging units is not driven between the joists it can be inserted loosely and then a clamp can be used to pull both joists together for a tight fit and then nailed tight to the joist or studding. The metal strip 46 may be made in a continuous length to permit the least number of joints for increased structural strength.

The main purpose of the present invention as for example as shown in FIGURES 1 through 4 is to provide a means whereby annular threaded securing elements or nails 35 can be driven through the bridging units and wherein the ferrules 26 will prevent the beams from splitting either from over hammering or splitting due to variations in atmospheric conditions, and a larger type nail or securing element 35 can be used so as to increase the holding power of the bridging units. The ferrules can be made of a suitable material such as sheet metal, reinforced resin fiber glass or the like and these ferrules or bands will put the wood on each end under compression. The bridging units are adapted to be pre-drilled as at 33 and 34 and these apertures 33 and 34 may be drilled slightly under size so as to function both as a guide for the annular threaded nail 35 and also to help prevent the nail from falling out. The reinforced bridging may utilize a suitable metal such as steel, aluminum or the like, or else preformed fiber glass resin can be used or different types of plastics having high tensile and impact strength may be used or utilized. The ferrules may either be pushed onto the bridging beams, or else they can be fabricated and placed on the beams.

The arrangement shown in FIGURES 5 and 6 is adapted to be used where joists or studding are separated equally and accurately so that the flat bridging, that is the flat ends 39 can be driven between the studding or joists 36 and nailed tight with nails on the ends of the protruding metal strip.

The ferrules are adapted to fit snugly over the wood on each end so that the wood is under compression at all times.

The chamfered portions 40 serve to insure that the wood bridging beams 38 will more readily or easily enter between the joists 36 and a tight fit is maintained or provided between the beams and the joists.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed, within the scope of the appended claim.

What is claimed is:

For use with spaced apart studs in a wall construction, a bridge unit comprising a beam of nailable material and of triangular cross-sectional configuration, said beam having flat ends, the portion of said beam adjacent each of said flat ends being chamfered, a ferrule encompassing the portion of said beam adjacent to and inwardly of each of said chamfered portions, a metal strip extending over one face of said beam and having a portion adjacent each end projecting beyond the adjacent flat end of said beam and terminating in a flange portion turned inwardly toward said beam, there being aligned holes in said strip and ferrule for the insertion therethrough of a nail for driving same outwardly of said flat end into a wall stud, said beam being adapted to fit between adjacent studs in a wall construction with each of the end portions of said strip overlying the studs and with the flat ends of the beam in engagement with the studs and with the flange portions extending partially over the faces of said stud remote from said beam.

References Cited in the file of this patent
UNITED STATES PATENTS

| 1,102,693 | Seyler | July 7, 1914 |
| 1,496,133 | Rothrock | June 3, 1924 |
| 1,649,226 | Gstalder | Nov. 15, 1927 |
| 1,787,006 | Kingston | Dec. 30, 1930 |
| 2,003,531 | Galante | June 4, 1935 |
| 2,016,702 | Bauer | Oct. 8, 1935 |
| 2,088,097 | Shodron | July 27, 1937 |
| 2,570,520 | Bushnell | Oct. 9, 1951 |

OTHER REFERENCES

Webster's New Collegiate Dictionary of 1956, page 306.